March 17, 1942.     O. OTTOSON     2,276,667
TEAPOT
Filed May 23, 1940
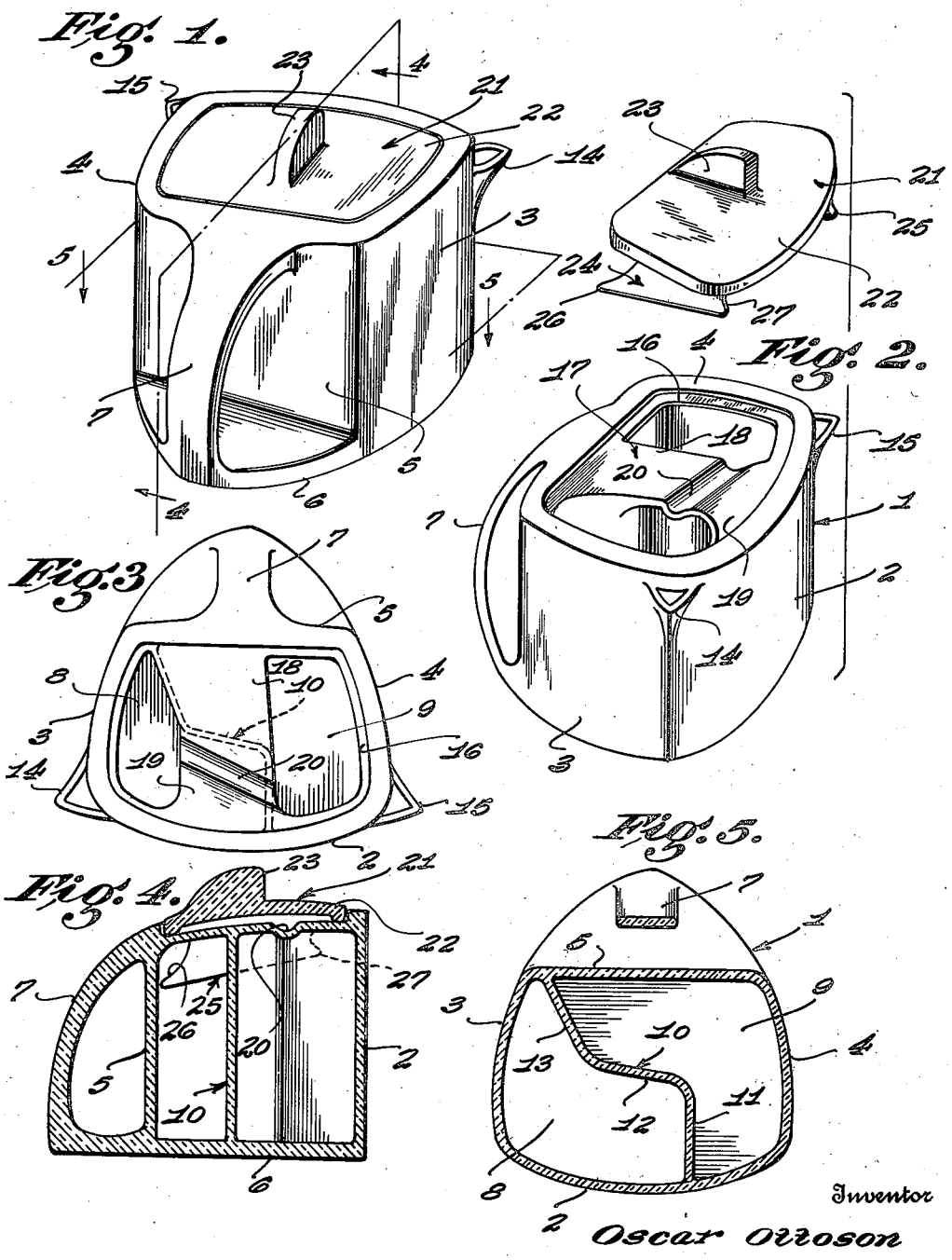
Inventor
Oscar Ottoson
By Lacey & Lacey, Attorneys Patented Mar. 17, 1942

2,276,667

UNITED STATES PATENT OFFICE 2,276,667

TEAPOT

Oscar Ottoson, Bronx, N. Y.

Application May 23, 1940, Serial No. 336,837

2 Claims. (Cl. 53—3)

This invention relates to an improved tea pot and has, for one of its objects, to provide a device of this character having a pair of compartments which are defined by a common partition, one of said compartments being for the reception of tea and the other of said compartments for containing hot water, each of said compartments having a pouring spout so that either tea or hot water may be poured from the pot.

Another object of the invention is to provide a tea pot wherein the compartments are defined by the common partition and a top wall, said top wall being common to both of the compartments and defining baffles therefor.

A further object of the invention is to provide a pot wherein the top wall is formed with a trough for allowing intercommunication between the upper ends of the compartments.

A still further object of the invention is to provide a pot of the character set forth employing a lid having means thereon for preventing accidental displacement when the pot is tilted, said lid fitting on the pot in such a manner that flow of liquid through the trough, from one compartment to the other, will not be impeded.

Other objects of the invention, not specifically mentioned hereinbefore, will become apparent during the course of the following description.

In the drawing:

Figure 1 is a perspective view of my improved tea pot, the lid being shown in position, Figure 2 is a perspective view of my tea pot with the lid removed, said lid also being shown in perspective above the pot, Figure 3 is a top plan view of the pot, and showing the partition employed in dotted lines, Figure 4 is a vertical sectional view on the line 4—4 of Figure 1 looking in the direction indicated by the arrows, and Figure 5 is a horizontal sectional view on the line 5—5 of Figure 1.

Referring now to the sheet of drawings on which like numerals designate like parts throughout the various views, the numeral 1 indicates in general the body of my improved pot. The body 1 is shown as being more or less of elliptical shape. It should be understood, however, that the elliptical shape of the body is a matter of choice. The body 1, however, includes a front wall 2, end walls 3 and 4, a rear wall 5 and a bottom wall 6, said bottom wall being extended rearwardly to define a base for the lower end of a molded handle 7. In manufacture, as will be understood, the body will be molded preferably of the highest quality of vitrified china, and, during the molding operation, the handle 7 will, of course, be formed.

The body is, of course, provided with a hollow interior which is divided into compartments 8 and 9 by means of a partition 10. The partition 10 is of offset shape. That is to say, said partition includes a straight portion 11 which is molded, at its forward end, to the front wall 2, a laterally turned portion 12, located substantially medially of the interior of the pot, and an obliquely extending portion 13 which has its rear end molded to the rear wall 5 near the junction thereof with the side wall 3. It will be seen that, due to the shape of the partition 10, the compartments 8 and 9 will be of substantially L-shape. As shown, the compartment 9 is slightly larger than the compartment 8. It is obvious that the compartments may be of the same size if desired, the size being controlled by the positioning of the partition 10.

Pouring spouts 14 and 15 are formed on the pot at its upper forward corners, said spouts 14 and 15 communicating, respectively, with the compartments 8 and 9 and providing means whereby liquids may be poured from either of said compartments. It is noteworthy that the spouts are so arranged that, when liquid is being poured from one of them, it will not be possible for liquid to flow from the other.

The body 1 is provided with an open upper end which is somewhat restricted by an inward flange 16, which extends about the upper rim of the pot. A top wall 17 is also employed, said top wall extending from substantially the midpoint of the wall 2 rearwardly to connect with the rear wall 5 throughout substantially half of its length. In other words, the top wall has one edge thereof extending substantially straight, from the front of the pot to the rear thereof, the other edge of said top wall being curved.

As will be seen by referring to Figures 2, 3 and 4 of the drawing, the partition 10 and the top wall 17 cooperate so that said top wall defines baffles 18 and 19 for portions of the upper ends of the compartments 8 and 9. More specifically, the baffle 18 covers a portion of the open upper end of the compartment 9 while the baffle 19 covers a portion of the open upper end of the compartment 8. The purpose for these baffles will be brought out in more detail hereinafter.

Formed in the top wall 17 near its forward end, and extending obliquely from the curved edge of said top wall to the straight edge thereof is a trough 20, said trough providing means for permitting flow of liquid from one compartment to the other when the pot is tilted either to one side or the other.

For closing the top of the compartments 8 and 9, I provide a lid 21, said lid having a wall 22 which is shaped so that it will rest with its edges in engagement with the flange 16 and the extreme end portions of the top wall 17. The wall 17 is, of course, shaped to conform to the shape of the open upper end of the pot, and said wall includes a manually engageable lug 23 which may be conveniently grasped when it is desired to remove the lid from the pot. Molded on the wall 22 are anchoring members 24 and 25 which are, as shown in Figure 4, adapted to fit loosely in the open upper ends of the compartments 8 and 9. The anchoring members 24 and 25 are each provided with hook-shaped projections 26, said projections being engageable with the rear wall and the flange 16, when the pot is tilted forwardly, for preventing accidental displacement of the lid from the pot by such tilting action. As shown at 27, the forward ends of the anchoring members are indented so that said indented portions may engage the forward portions of the flange 16 and thus provide means whereby the forward end of the lid will be prevented from slipping out of the pot when said pot is being tilted.

In use, boiling water is poured into one compartment, preferably the compartment 8, and tea is placed in the other compartment. It is desirable that the tea be placed in the larger of the compartments, where a difference in size exists. When it is desired to weaken the strength of the tea in the tea compartment, it is only necessary to tilt the pot to such an angle that hot water will flow from the compartment 8 through the trough 20 into the compartment 9. Dilution of the tea may thus be effected with minimum effort. The baffles 18 and 19 will prevent escape of tea or hot water from their respective compartments when the pot is tilted to an ordinary angle. That is to say, when the pot is tilted for pouring tea from the compartment 9 through the spout 15, the hot water in the compartment 8 will rise first along that portion of the wall of the partition, within the compartment 8, beneath the baffle 19, and will be prevented by said baffle from flowing into the tea compartment during a normal tilting and pouring operation. Should the pot be tilted to an extreme angle, water will, as stated heretofore, flow from the edge of the baffle and through the trough 20 into the tea compartment, for weakening said tea to a desired strength. Of course, tea may be caused to flow from the compartment 9 into the compartment 8 by tilting the pot to an extreme angle, in the opposite direction.

Attention is particularly called to the fact that the top wall 17 is common to both of the compartments 8 and 9 and that said top wall 17 provides baffles for said compartments. It is also desired particularly to mention that, due to the fact that the anchoring members 24 and 25 fit loosely within the open upper ends of the compartments 8 and 9, said anchoring members will not permit flow of liquid from one compartment to the other through the trough 20 when the lid 21 is in place.

It is obvious that, although my improved tea pot was originally designed for containing tea and hot water, it can be used for a number of other beverage combination uses, such as, tea and coffee, coffee and hot milk (the French way of serving coffee), iced tea and iced coffee.

Having thus described the invention, what is claimed as new is:

1. A tea pot including a body having side walls, a front wall and a rear wall, pouring spouts carried by the body and communicating with the interior thereof, a partition carried by the body and defining a pair of compartments within the body, said compartments being of substantially inverted L shape, and a top wall carried by the partition and the front and rear walls of the body, said top wall defining baffles covering portions of each of said compartments for preventing accidental flow of liquid from one compartment to the other when the pot is tilted ordinarily during a pouring operation, said top wall having a trough formed therein and communicating between the compartments for permitting flow of liquid from one compartment to the other upon lateral tilting of the pot.

2. In a tea pot, a body having a partition defining a pair of compartments, a top wall carried by the partition, an inwardly directed flange carried by the body, said top wall having a trough for conducting liquid flow from one compartment to the other when the pot is laterally tilted, a lid normally associated with the pot, and anchoring members carried by the lid and loosely fitting within the open upper ends of the compartments, said anchoring members diverging from each other at opposite sides of the lid and having hooked end portions engageable with the flange for preventing displacement of said lid when the tea pot is tilted.

OSCAR OTTOSON.